(12) United States Patent
Lu

(10) Patent No.: US 7,081,612 B1
(45) Date of Patent: Jul. 25, 2006

(54) LIGHT PROJECTION METHOD AND APPARATUS FOR AN OPTICAL MOUSE

(75) Inventor: Shu-Feng Lu, Taipei (TW)

(73) Assignee: Pacer Technology Co., Ltd., Taipei (TW)

( * ) Notice: Subject to any disclaimer, the term of this patent is extended or adjusted under 35 U.S.C. 154(b) by 0 days.

(21) Appl. No.: 11/104,460

(22) Filed: Apr. 13, 2005

(51) Int. Cl.
G06M 7/00 (2006.01)
G09G 5/08 (2006.01)
(52) U.S. Cl. ..................... 250/221; 345/166
(58) Field of Classification Search ........... 250/559.34, 250/559.36–559.44, 221, 216; 345/163, 345/166

See application file for complete search history.

(56) References Cited

U.S. PATENT DOCUMENTS 6,717,734 B1 * 4/2004 Fujimoto ................ 359/619

* cited by examiner

Primary Examiner—Goergia Epps
Assistant Examiner—Brian Livedalen
(74) Attorney, Agent, or Firm—Rosenberg, Klein & Lee

(57) ABSTRACT

A light projection method and apparatus for an optical mouse is provided. The light projection method and apparatus for an optical mouse comprises: provides a light projection apparatus and projects a light into the light projection apparatus to form a first light beam and a second light beam. The first light beam is vertically projected to a detection area of an image detection surface and the second light beam is slantwise projected to the detection area of the image detection surface. The first light beam allows the image detection unit of the optical mouse to exactly detect the image on the detection area. The second light beam makes the contrast between the concave and the convex of the detection area become more obvious and the ability of the image detection unit of the optical mouse to detect and identify the on the detection surface is effectively enhanced.

18 Claims, 9 Drawing Sheets

LIGHT PROJECTION METHOD AND APPARATUS FOR AN OPTICAL MOUSE

BACKGROUND OF THE INVENTION

1. Field of the Invention

The present invention relates to a light projection method and apparatus. In particular, this invention provides a light projection method and apparatus for an optical mouse.

2. Description of the Related Art

When an optical mouse is moved to an image detection surface, the optical mouse detects the image located on the concave and the convex of the image detection surface through an image detection unit. Then, the optical mouse executes an optical energy level transformation via a circuit unit to calculate the displacement and the direction of displacement. After that, any movements a user performs on the optical mouse are mirrored by the cursor on a display unit.

Please refer to FIG. 1, which shows an optical mouse of the prior art. The optical mouse comprises a light projection apparatus 8, a light source 2, an image-forming lens 3 and an image detection unit 4. The light projection apparatus 8 comprises a light-guiding body that comprises a convex lens surface 80, a first incline surface 81, a second incline surface 82 and a light-emitting surface 83. The first incline surface 81 corresponds to the convex lens surface 80. The second incline surface 82 corresponds to the first incline surface 81. The light-emitting surface 83 corresponds to the second incline surface 82 and faces towards an image detection surface 5. A transparent medium 6, such as a glass, is disposed on the image detection surface 5. The light emitting from the light source 2 enters the light-guiding body through the convex lens surface 80. The light is reflected from the first incline surface 81 to the second incline surface 82. Next, the light is reflected by the second incline surface 82 to form a light beam L and is slantwise transmitted to the transparent medium 6. The light beam L passes through the transparent medium 6 and is slantwise projected to the image detection surface 5.

Because the intersection point of the light beam L and the image detection surface 5 is not located on the detection area 50 of the image detection light axis X formed by the image-forming lens 3 and the image detection unit 4, the image detection unit 4 can't detect the exact location of the image at the detection area 50 of the image detection surface 5. Therefore, when the optical mouse is moved on the image detection surface 5, the movement of the cursor displayed on the display unit is not sensitive enough and, in the worst case, the cursor can't be moved.

Please refer to FIG. 2, which shows an optical mouse of another prior art. The optical mouse comprises a light projection apparatus 9, a light source 2, an image-forming lens 3 and an image detection unit 4. The light projection apparatus 9 comprises a light-guiding body that comprises a convex lens surface 90, a first incline surface 91, a light-emitting surface 93 and a light splitting surface 94. The first incline surface 91 corresponds to the convex lens surface 90. The light-emitting surface 93 corresponds to the first incline surface 91. The light splitting surface 94 corresponds to the light-emitting surface 93 and the first incline surface 91. An opening 95 is formed between the light splitting surface 94 and the light-emitting surface 93 and faces toward an image detection surface 5. The light splitting surface 94 also faces towards the image detection surface 5. A transparent medium 6, such as a glass, is disposed on the image detection surface 5. The light emitting from the light source 2 enters the light-guiding body through the convex lens surface 90. The light is reflected from the first incline surface 91 to the light splitting surface 94. Next, the light is reflected by the light splitting surface 94 to form a light beam L and is vertically transmitted to the transparent medium 6. The light beam L passes through the transparent medium 6 and is vertically projected to the detection area 50 of the image detection surface 5.

Because the intersection point of the light beam L and the image detection surface 5 is located on the detection area 50 of the image detection light axis X formed by the image-forming lens 3 and the image detection unit 4, the image detection unit 4 can detect the exact location of the image in the detection area 50 of the image detection surface 5. However, when the light beam L is vertically projected to the image detection surface 5, the contrast between the concave and the convex of the image detection surface 5 is not obvious due to the image detection surface 5 being an uneven surface. This increases the difficulty of the image being detected by the image detection unit 4. As such, when the optical mouse is moved over the image detection surface 5, the movement of the cursor displayed on the display unit is not replicated. Especially, the movement of the cursor becomes uncontrollable when the optical mouse is rapidly moved over the image detection surface 5.

SUMMARY OF THE INVENTION

The main purpose of the present invention is to provide a light projection method and apparatus for an optical mouse. When the optical mouse is moved over an image detection surface, the ability of the image detection unit of the optical mouse to detect and identify an image on the detection area of the image detection surface is effectively enhanced.

In order to achieve the above goal, the present invention provides a light projection method for an optical mouse. The method comprises:

1. Provides a light projection apparatus.
2. Projects a light into the light projection apparatus to form a first light beam and a second light beam. The first light beam is vertically projected onto a detection area of an image detection surface and the second light beam is slantwise projected onto the detection area of the image detection surface.

In order to achieve the above goal, the present invention provides a light projection apparatus for an optical mouse. The light projection apparatus comprises a light-guiding body that comprises a first incline surface, a second incline surface and a light splitting surface. The second incline surface and the light splitting surface correspond to the first incline surface and face towards an image detection surface. When a light enters the light-guiding body, part of the light is reflected from the first incline surface to the light splitting surface and is reflected from the light splitting surface to form a first light beam and is vertically projected to the detection area of the image detection surface. Part of the light is reflected from the first incline surface to the second incline surface and is refracted from the second incline surface to form a second light beam and is slantwise projected to the detection area of the image detection surface.

In order to achieve the above goal, the present invention provides a light projection apparatus for an optical mouse. The light projection apparatus comprises a light-guiding body that comprises a first incline surface, a second incline surface and a light splitting surface. The light splitting surface corresponds to the first incline surface and faces towards an image detection surface. When a light enters the light-guiding body, part of the light is reflected from the first incline surface to the light splitting surface and is reflected from the light splitting surface to form a first light beam and is vertically projected to the detection area of the image detection surface. Part of the light is reflected from the second incline surface to form a second light beam and is slantwise projected to the detection area of the image detection surface.

By vertically projecting the first light beam to the detection area of the image detection surface, the image detection unit of the optical mouse can exactly detect the location of the reflected light beam on the detection area. By slantwise projecting the second light beam to the detection area of the image detection surface, the contrast between the concave and the convex of the detection area becomes more obvious and the ability of the image detection unit of the optical mouse to detect and identify the images on the detection area of the image detection surface is effectively enhanced.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
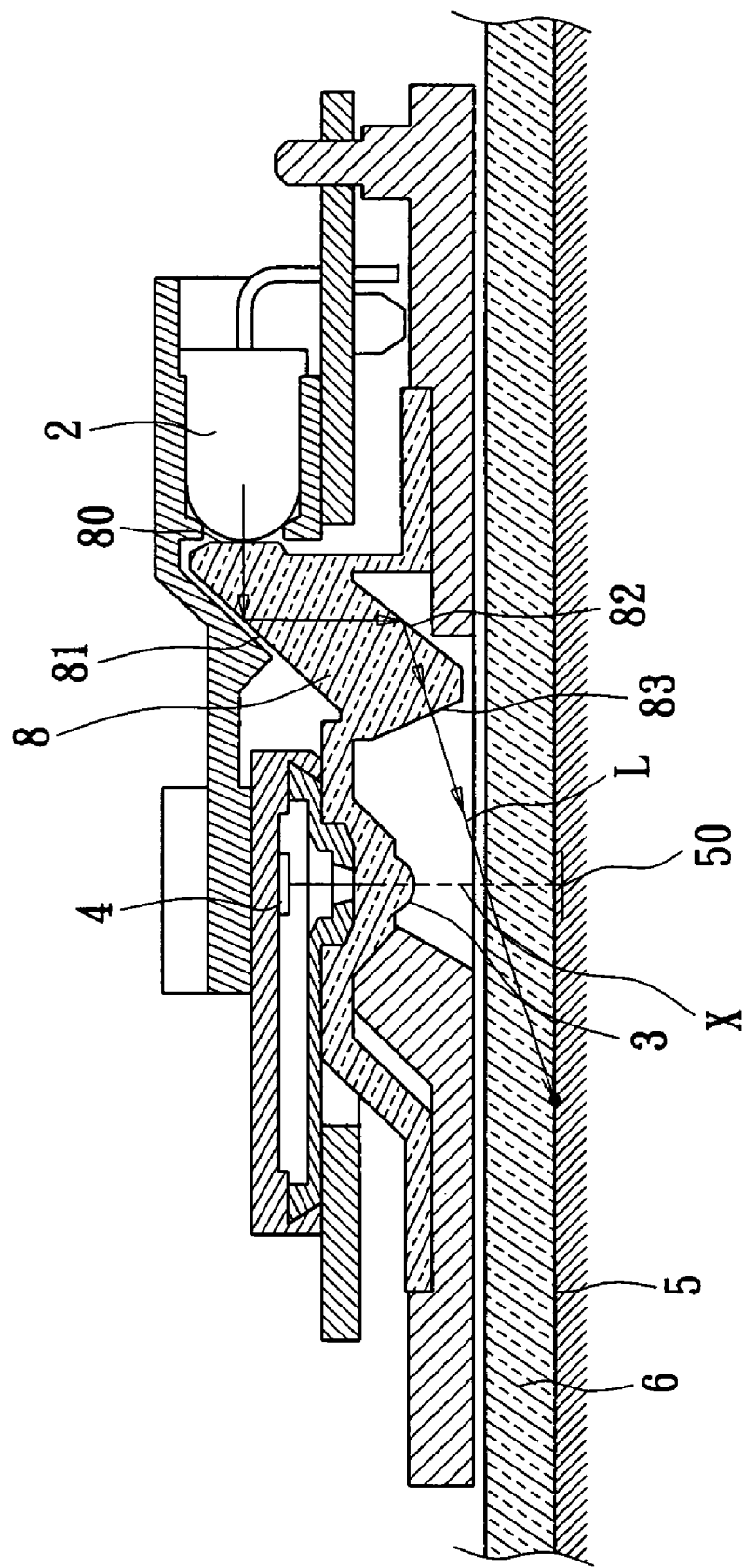
FIG. 1 is a cross-sectional schematic diagram of a light projection apparatus for an optical mouse of the prior art.
Figure 2:
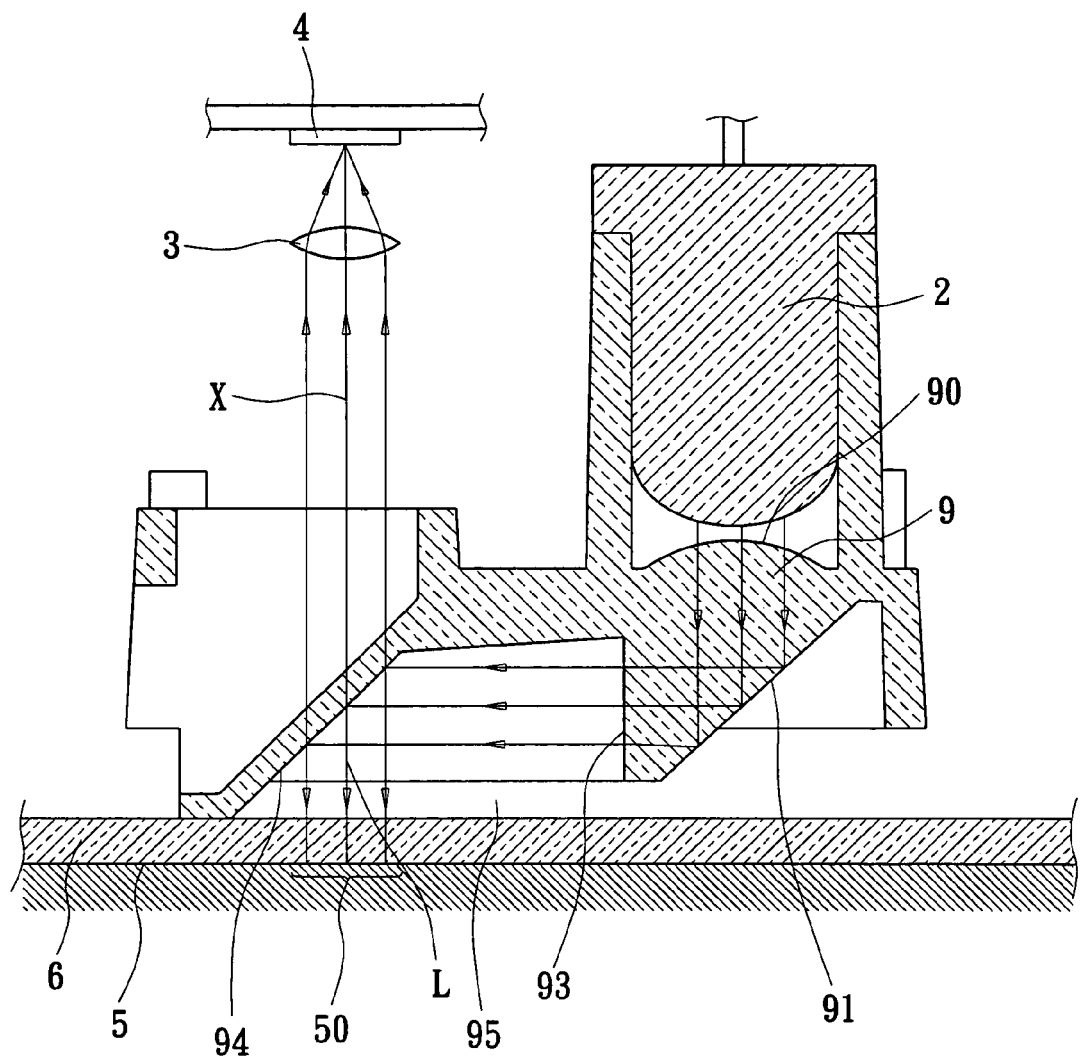
FIG. 2 is a cross-sectional schematic diagram of a light projection apparatus for an optical mouse of another prior art.
Figure 3:
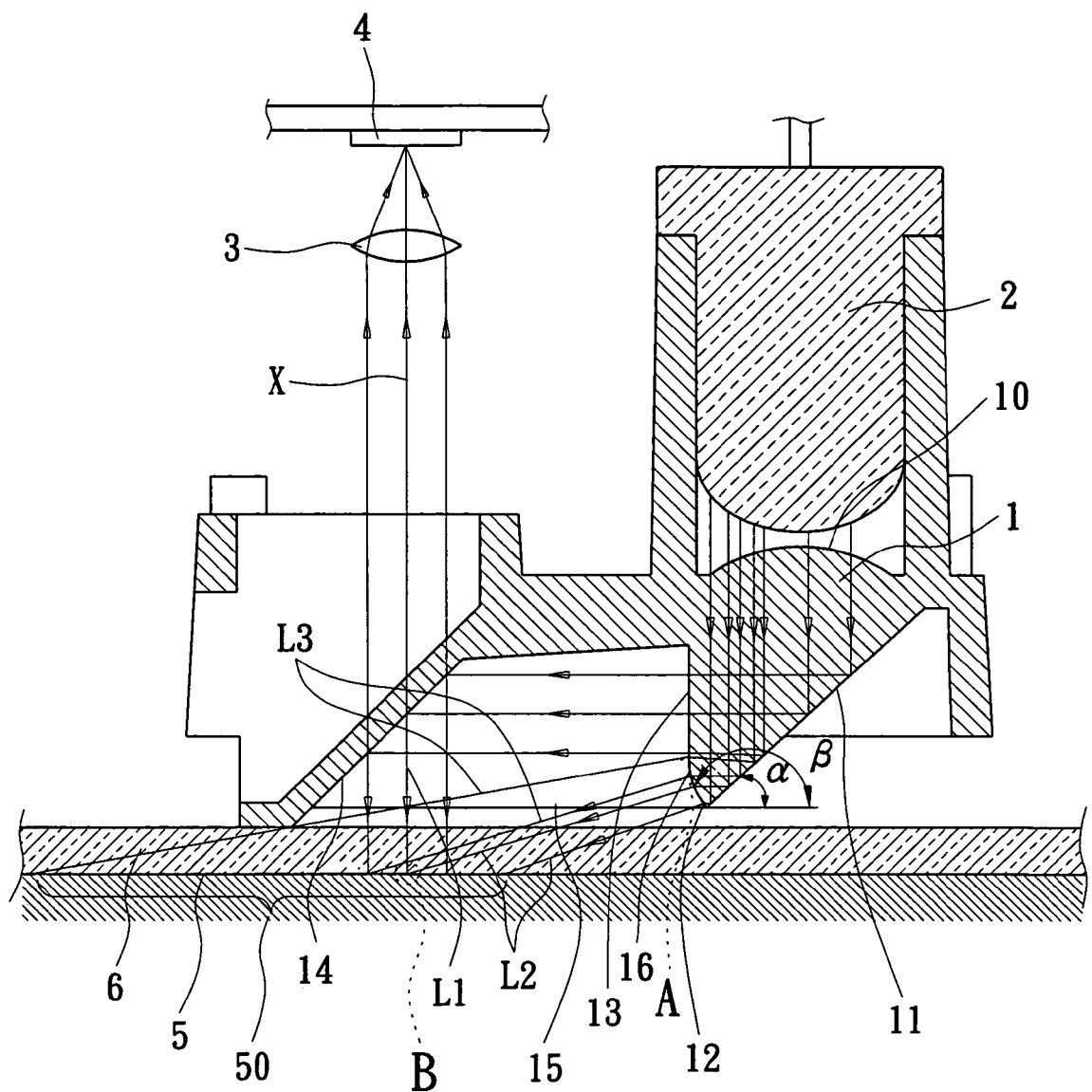
FIG. 3 is a cross-sectional schematic diagram of a light projection apparatus for an optical mouse of the first embodiment of the present invention.

Please refer to FIG. 3, which shows a light projection apparatus for an optical mouse of the first embodiment of the present invention. The optical mouse comprises a light projection apparatus 1, a light source 2, an image-forming lens 3 and an image detection unit 4.

The light projection method for an optical mouse of the present invention comprises:

1. Provides a light projection apparatus 1.

The light projection apparatus 1 of the present invention comprises a light-guiding body. The image-forming lens 3 is connected with the light-guiding body and can be made integrally in one piece. The light-guiding body comprises a convex lens surface 10, a first incline surface 11, a second incline surface 12, a light-emitting surface 13 and a light splitting surface 14. A light projected onto the light splitting surface 14 can be reflected by the light splitting surface 14 or it can be passed through the light splitting surface 14.

The first incline surface 11 corresponds to the convex lens surface 10. The second incline surface 12, the light-emitting surface 13 and the light splitting surface 14 correspond to the first incline surface 11. The light splitting surface 14 corresponds to the light-emitting surface 13. An opening 15 is formed between the second surface 12 and the light splitting surface 14 and faces towards an image detection surface 5. The second surface 12 and the light splitting surface 14 also face towards the image detection surface 5. A transparent medium 6, such as a glass, is disposed on the image detection surface 5. An included angle $\alpha$ between the image detection surface 5 and the first incline surface 11 is less than an included angle $\beta$ between the image detection surface 5 and the second incline surface 12.

2. Projects a light into the light projection apparatus 1 to form a first light beam L1 and a second light beam L2. The first light beam L1 is vertically projected to a detection area 50 of the image detection surface 5 and the second light beam L2 slantwise projects to the detection area 50 of the image detection surface 5.

Refer to FIG. 3 that shows a light emitting from the light source 2 entering the light-guiding body through the convex lens surface 10. Part of the light is reflected from the first incline surface 11 through the light-emitting surface 13 to the light splitting surface 14 and is reflected from the light splitting surface 14 to form the first light beam L1 and the first light beam L1 vertically transmits to the transparent medium 6. The first light beam L1 passes through the transparent medium 6 and is vertically projected to the detection area 50 of the image detection surface 5. Part of the light is reflected from the first incline surface 11 to the second incline surface and is refracted by the second surface 12 to form the second light beam L2 and the second light beam L2 slantwise transmits to the transparent medium 6. The second light beam L2 passes through the transparent medium 6 and slantwise projects to the detection area 50 of the image detection surface 5.

Figure 3A:
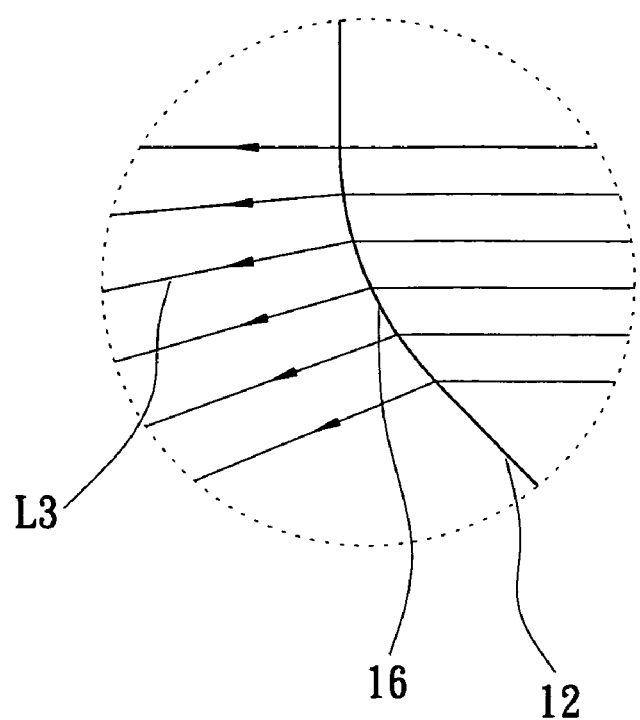
FIG. 3A is a magnified portion of part A of FIG. 3.

Please refer to FIG. 3 and FIG. 3A that show the light projection apparatus 1 for the optical mouse of the present invention that further comprises an arc surface 16. The arc surface 16 is connected to the second incline surface 12 and the light-emitting surface 13 and is located between the second incline surface 12 and the light-emitting surface 13. Part of the light of the light source 2 is reflected from the first incline surface 11 to the arc surface 16 and is refracted by the arc surface 16 to form the third light beam L3 with a fan-shape. The third light beam L3 slantwise projects to the detection area 50 of the image detection surface 5 and is located between the first light beam L1 and the second light beam L2.

3. The first light beam L1, the second light beam L2 and the third light beam L3 are reflected from the detection area 50 of the image detection surface 5 through the light splitting surface 14 and the image-forming lens 3 to the image detection unit 4. The displacement direction and the displacement can be calculated by the circuit unit (not be shown in the diagram) of the optical mouse.

Figure 3B:
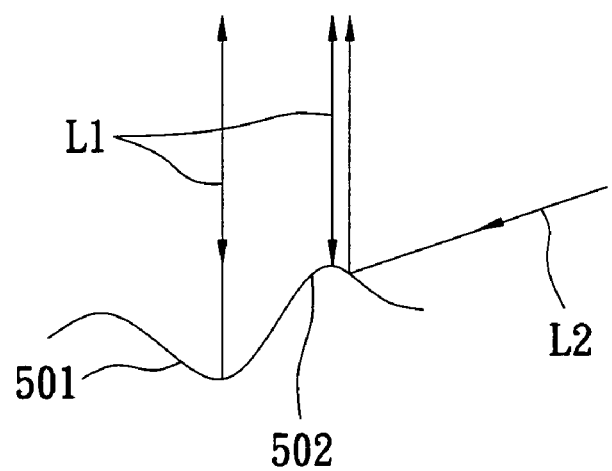
FIG. 3B is a magnified portion of part B of FIG. 3.

Please refer to FIG. 3 and FIG. 3B that show the first light beam L1 being is vertically projected to the detection area 50 of the image detection surface 5. The detection area 50 is located on an image detection light axis X formed by the image-forming lens 3 and the image detection unit 4. Therefore, the image detection unit 4 of the optical mouse can exactly detect the location of the image the detection area 50 of the image detection surface 5. The second light beam L2 slantwise projects to the detection area 50 of the image detection surface 5. The concave 501 and the convex 502 of the detection area 50 of the image detection surface 5 separately produce a shadow effect and a light-reflection effect. So, the contrast between the concave 501 and the convex 502 of the detection area 50 of the image detection surface 5 becomes more obvious and the ability of the image detection unit 4 of the optical mouse to detect and identifyion area 50 of the image on the detection area 50 is effectively enhanced. When the optical mouse is moved on the image detection surface 5, the image detection unit 4 detects the clear image to make the movement of the cursor displayed on the display unit more sensitive. The third light beam L3 located between the first light beam L1 and the second light beam L2 forms a light beam with a full angle. The image detection unit 4 detects the clear image through the above invention.

Figure 3C:
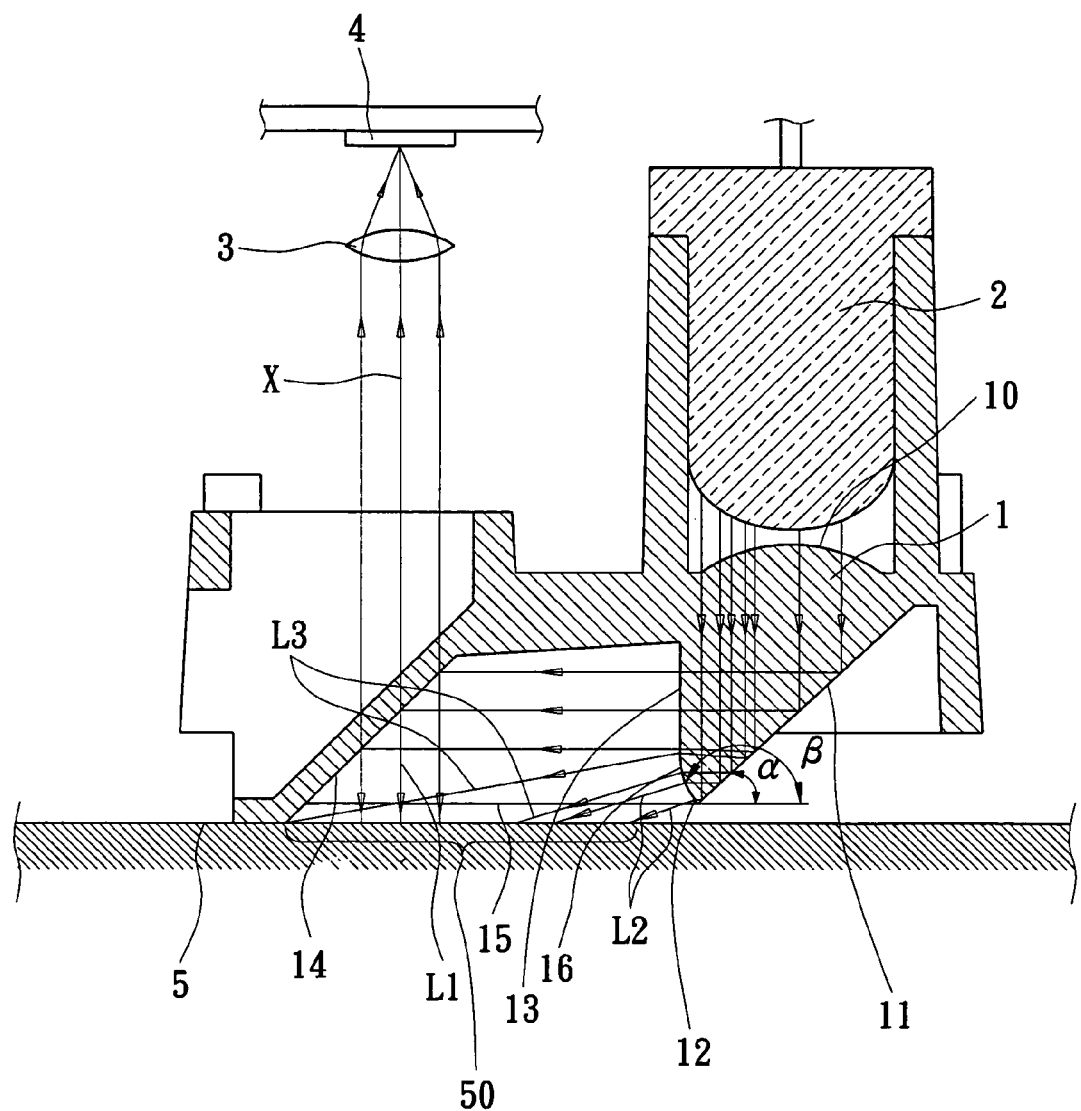
FIG. 3C is a cross-sectional schematic diagram of another light projection apparatus for an optical mouse of the first embodiment of the present invention.

Please refer to FIG. 3C, in which there isn't a transparent medium on the image detection surface 5, the reflection range reflected from the first light beam L1, the second light beam L2 and the third light beam L3 to the detection area 50 becomes larger to enhance the detection function of the image detection unit 4.

Figure 4:
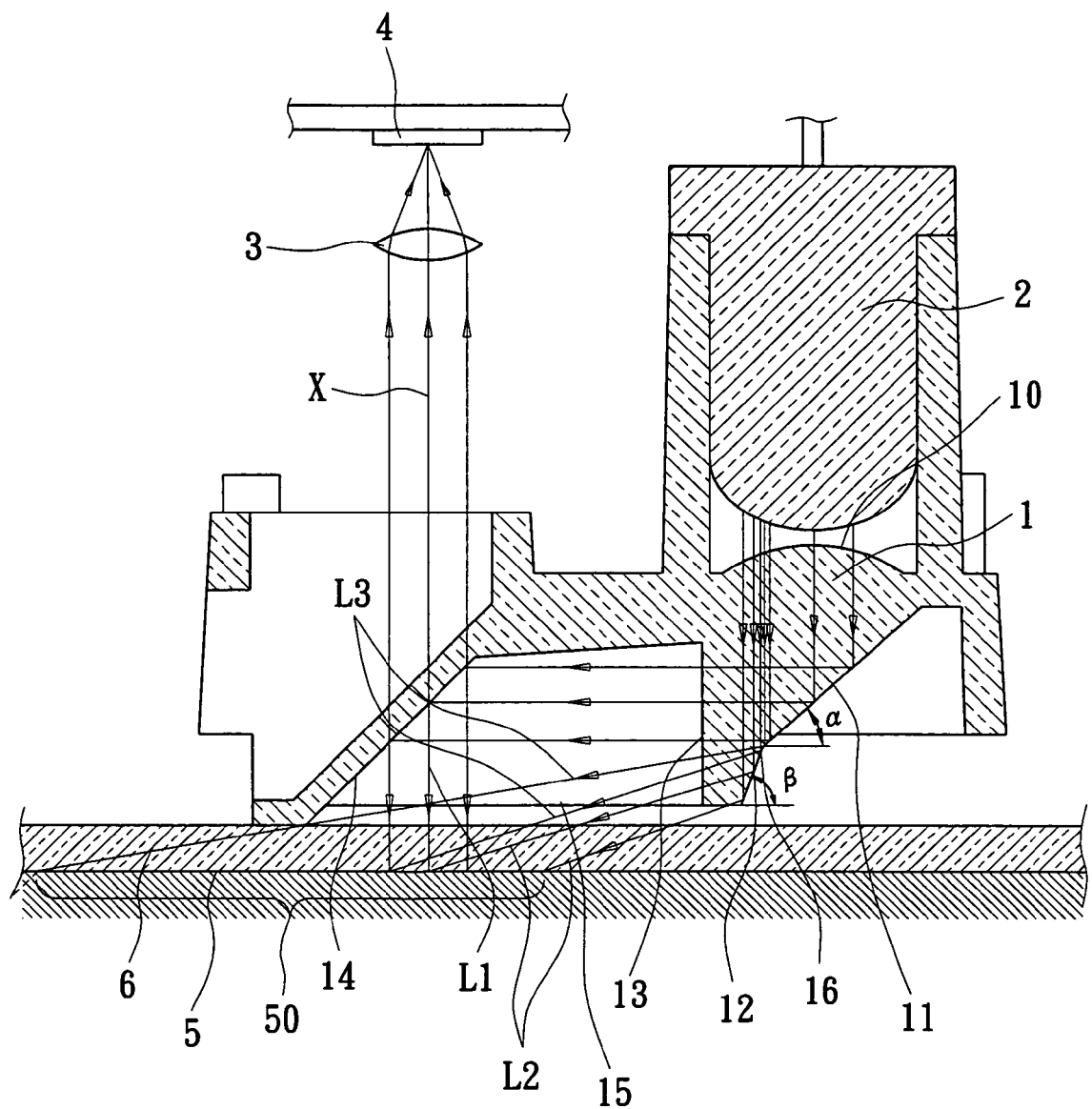
FIG. 4 is a cross-sectional schematic diagram of a light projection apparatus for an optical mouse of the second embodiment of the present invention.

Please refer to FIG. 4, which shows a light projection apparatus for an optical mouse of the second embodiment of the present invention. The light projection method for an optical mouse of the present invention comprises:

1. Provides a light projection apparatus 1.

The light projection apparatus 1 of the present invention comprises a light-guiding body. The image-forming lens 3 is connected with the light-guiding body and can be made integrally in one piece. The light-guiding body comprises a convex lens surface 10, a first incline surface 11, a second incline surface 12, a light-emitting surface 13 and a light splitting surface 14. A light projecting to light splitting surface 14 can be reflected by the light splitting surface 14 or pass through the light splitting surface 14.

The first incline surface 11 and the second incline surface 12 correspond to the convex lens surface 10. The light-emitting surface 13 corresponds to the first incline surface 11 and the second incline surface 12. The light splitting surface 14 corresponds to the first incline surface 11 and the light-emitting surface 13. An opening 15 is formed between the light splitting surface 14 and the light-emitting surface 13 and faces towards an image detection surface 5. A transparent medium 6, such as a glass, is disposed on the image detection surface 5. An included angle α between the image detection surface 5 and the first incline surface 11 is less than an included angle β between the image detection surface 5 and the second incline surface 12. The first incline surface 11 is close to the convex lens surface 10 and the second incline is close to the image detection surface 5.

2. Projects a light into the light projection apparatus 1 to form a first light beam L1 and a second light beam L2. The first light beam L1 is vertically projected to a detection area 50 of the image detection surface 5 and the second light beam L2 slantwise projects to the detection area 50 of the image detection surface 5.

Referring to FIG. 4, a light emitting from the light source 2 enters the light-guiding body through the convex lens surface 10. Part of the light is reflected from the first incline surface 11 through the light-emitting surface 13 to the light splitting surface 14 and is then reflected from the light splitting surface 14 to form the first light beam L1 and the first light beam L1 is vertically transmitted to the transparent medium 6. The first light beam L1 passes through the transparent medium 6 and is vertically projected to the detection area 50 of the image detection surface 5. Part of the light is reflected from the second incline surface 12 to form the second light beam L2 and the second light beam L2 is slantwise transmitted to the transparent medium 6. The second light beam L2 passes through the transparent medium 6 and is slantwise projected to the detection area 50 of the image detection surface 5.

Please refer to FIG. 4 that shows the light projection apparatus 1 for an optical mouse of the present invention further comprising an arc surface 16. The arc surface 16 is connected to the first incline surface 11 and the second incline surface 12 and is located between the first incline surface 11 and the second incline surface 12. Part of the light of the light source 2 is reflected from the arc surface 16 to form the third light beam L3 with a fan-shape. The third light beam L3 is slantwise projected to the detection area 50 of the image detection surface 5 and is located between the first light beam L1 and the second light beam L2.

3. The first light beam L1, the second light beam L2 and the third light beam L3 are reflected from the detection area 50 of the image detection surface 5 through the light splitting surface 14 and the image-forming lens 3 to the image detection unit 4. The displacement direction and the displacement can be calculated by the circuit unit (not shown in the diagram) of the optical mouse. The first incline surface 11, the second incline surface 12 and the arc surface 16 separately reflect the light to form the first light beam L1, the second light beam L2 and the third light beam L3 and project the light beams to the detection area 50 of the image detection surface 5. The above method achieves the same goals as the first embodiment of the present invention.

Figure 4A:
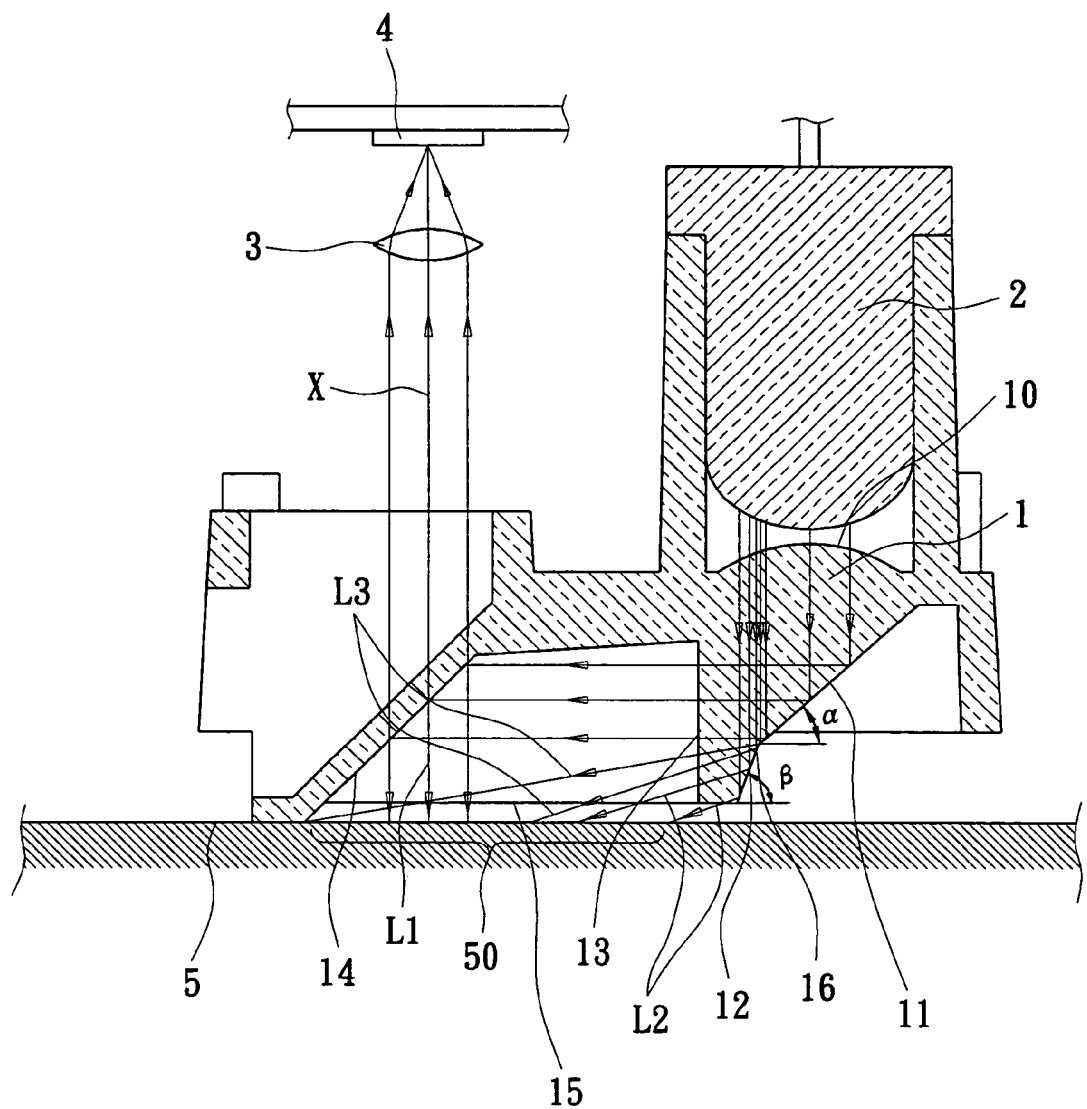
FIG. 4A is a cross-sectional schematic diagram of another light projection apparatus for an optical mouse of the second embodiment of the present invention.

Please refer to FIG. 4A in which there exists no transparent medium 6 on the image detection surface 5, the reflection range reflected from the first light beam L1, the second light beam L2 and the third light beam L3 to the detection area 50 becomes larger to enhance the detecting function of the image detection unit 4.

Figure 5:
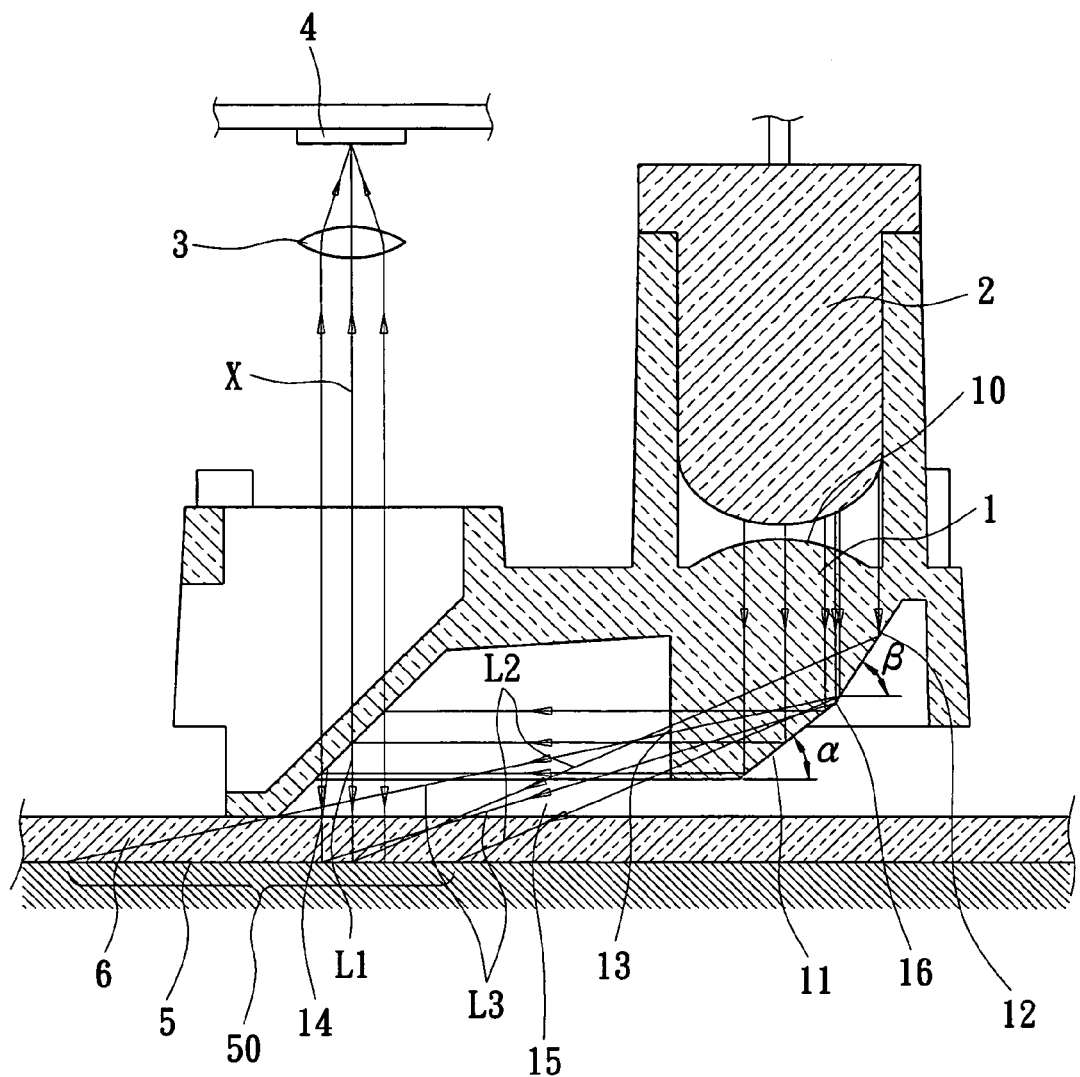
FIG. 5 is a cross-sectional schematic diagram of a light projection apparatus for an optical mouse of the third embodiment of the present invention.

Please refer to FIG. 5, which shows a light projection apparatus for an optical mouse of the third embodiment of the present invention. The difference between the third embodiment and the second embodiment is that the first incline surface 11 is close to the image detection surface 5 and the second incline is close to the convex lens surface 10. The above method achieves the same goals as the first embodiment of the present invention.

Figure 5A:
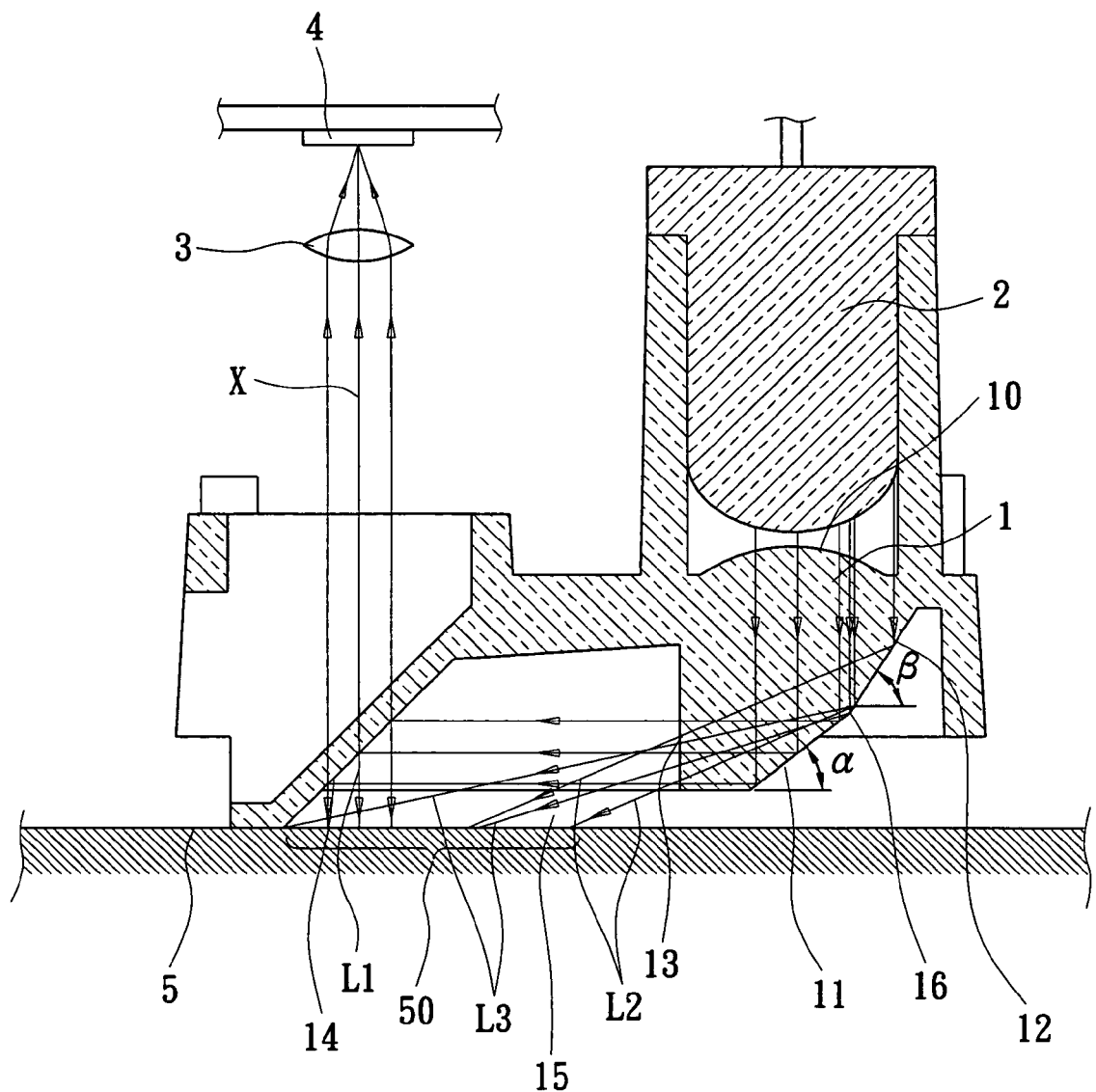
FIG. 5A is a cross-sectional schematic diagram of another light projection apparatus for an optical mouse of the third embodiment of the present invention.

Please refer to FIG. 5A, in which there exists no transparent medium 6 on the image detection surface 5, the reflection range reflected from the first light beam L1, the second light beam L2 and the third light beam L3 to the detection area 50 becomes larger to enhance the detecting function of the image detection unit 4.

The light projection method and apparatus for an optical mouse of the present invention has the following characteristics:

1. Because the first light beam is vertically projected to the detection area of the image detection surface, the image detection unit of the optical mouse can exactly detect the image located at the detection area of the image detection surface.

2. Because the second light beam is slantwise projected to the detection area of the image detection surface, the contrast between the concave and the convex of the detection area of the image detection surface becomes more obvious and the ability of the image detection unit of the optical mouse to detect and identify the image on the image detection surface is substantially enhanced. When the optical mouse is moved on the image detection surface, the image detection unit detects the clear image to make the movement of the cursor displayed on the display unit more sensitive.

3. The third light beam refracted or reflected from the arc surface is slantwise projected to the detection area of the image detection surface and is located between the first light beam and the second light beam to form a light beam with a full angle. The image detection unit detects the image more clearly.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A light projection method for an optical mouse comprising:
providing a light projection apparatus; and
projecting a light into the light projection apparatus to form a first light beam and a second light beam, the first light beam is vertically projected to a detection area of an image detection surface and the second light beam is slantwise projected to the detection area of the image detection surface, wherein the light projection apparatus includes a first incline surface, a second incline surface and a light splitting surface, part of the light being reflected from the first incline surface to the light splitting surface and is reflected from the light splitting surface to form the first light beam, part of the light being reflected from the first incline surface to the second incline surface and is refracted by the second incline surface to form the second light beam.

2. The light projection method for an optical mouse of claim 1, wherein an included angle between the image detection surface and the first incline surface is less than an included angle between the image detection surface and the second incline surface.

3. The light projection method for an optical mouse of claim 1, wherein the light projection apparatus further comprising an arc surface, the arc surface is connected to the second incline surface, part of the light is reflected from the first incline surface to the arc surface and is refracted by the arc surface to form a third light beam with a fan-shape, the third light beam is slantwise projected to the detection area of the image detection surface and is located between the first light beam and the second light beam.

4. The light projection method for an optical mouse of claim 3 further comprising: the first light beam, the second light beam and the third light beam are reflected from the detection area of the image detection surface through the light splitting surface and the image-forming lens to the image detection unit.

5. The light projection method for an optical mouse of claim 1, wherein the light projection apparatus comprising a first incline surface, a second incline surface and a light splitting surface, part of the light is reflected from the first incline surface to the light splitting surface and is reflected from the light splitting surface to form the first light beam, part of the light is reflected from the second incline surface to form the second light beam.

6. The light projection method for an optical mouse of claim 5, wherein an included angle between the image detection surface and the first incline surface is less than an included angle between the image detection surface and the second incline surface.

7. The light projection method for an optical mouse of claim 5, wherein the light projection apparatus further comprising an arc surface, the arc surface is connected to the first incline surface and the second incline surface and is located between the first incline surface and the second incline surface, part of the light is reflected from the arc surface to form a third light beam with a fan-shape, the third light beam is slantwise projected to the detection area of the image detection surface and is located between the first light beam and the second light beam.

8. The light projection method for an optical mouse of claim 7 further comprising the first light beam, the second light beam and the third light beam that are reflected from the detection area of the image detection surface through the light splitting surface and the image-forming lens to the image detection unit.

9. A light projection apparatus for an optical mouse comprising:
a light-guiding body, comprising a first incline surface, a second incline surface and a light splitting surface, the second incline surface and the light splitting surface correspond to the first incline surface and faces towards an image detection surface;
wherein a light is projected into the light-guiding body, part of the light is reflected from the first incline surface to the light splitting surface and is reflected from the light splitting surface to form the first light beam, the first light beam is vertically projected to a detection area of an image detection surface, part of the light is reflected from the first incline surface to the second incline surface and is refracted by the second surface to form the second light beam, the second light beam is slantwise projected to the detection area of the image detection surface.

10. The light projection apparatus for an optical mouse of claim 9, wherein the light-guiding body comprises a convex lens surface, the first incline surface corresponds to the convex lens surface, the light enters into the light-guiding body via the convex lens surface.

11. The light projection apparatus for an optical mouse of claim 9, wherein an included angle between the image detection surface and the first incline surface is less than an included angel between the image detection surface and the second incline surface.

12. The light projection apparatus for an optical mouse of claim 9, wherein the light-guiding body comprising an arc surface, the arc surface is connected to the second incline surface, part of the light is reflected from the first incline surface to the arc surface and is refracted by the arc surface to form a third light beam with a fan-shape, the third light beam is slantwise projected to the detection area of the image detection surface and is located between the first light beam and the second light beam.

13. A light projection apparatus for an optical mouse comprising:
a light-guiding body, comprising a first incline surface, second incline surface and a light splitting surface, the light splitting surface corresponds to the first incline surface and faces towards an image detection surface;

wherein a light is projected into the light-guiding body, part of the light is reflected from the first incline surface to the light splitting surface and is reflected from the light splitting surface to form the first light beam, the first light beam is vertically projected to a detection area of an image detection surface, part of the light is reflected from the second incline surface to form the second light beam, the second light beam is slantwise projected to the detection area of the image detection surface.

14. The light projection apparatus for an optical mouse of claim 13, wherein the light-guiding body comprises a convex lens surface, the first incline surface and the second incline surface correspond to the convex lens surface, the light enters into the light-guiding body via the convex lens surface.

15. The light projection apparatus for an optical mouse of claim 14, wherein the first incline surface is close to the convex lens surface and the second incline surface is close to the image detection surface.

16. The light projection apparatus for an optical mouse of claim 14, wherein the first incline surface is close to the image detection surface and the second incline surface is close to the convex lens surface.

17. The light projection apparatus for an optical mouse of claim 13, wherein an included angle between the image detection surface and the first incline surface is less than an included angle between the image detection surface and the second incline surface.

18. The light projection apparatus for an optical mouse of claim 13, wherein the light-guiding body comprising an arc surface, the arc surface is connected to the first incline and the second incline surface and is located between the first incline and the second incline surface, part of the light is reflected from the arc surface to form a third light beam with a fan-shape, the third light beam is slantwise projected to the detection area of the image detection surface and is located between the first light beam and the second light beam.

* * * * *